Dec. 26, 1939.  L. G. COPEMAN  2,184,633
MOUNTING BRACKET
Filed March 24, 1938   2 Sheets-Sheet 1

INVENTOR.
Floyd G. Copeman
BY
Barnes, Kisselle, Laughlin & Raisch
ATTORNEYS

Dec. 26, 1939.  L. G. COPEMAN  2,184,633
MOUNTING BRACKET
Filed March 24, 1938  2 Sheets-Sheet 2
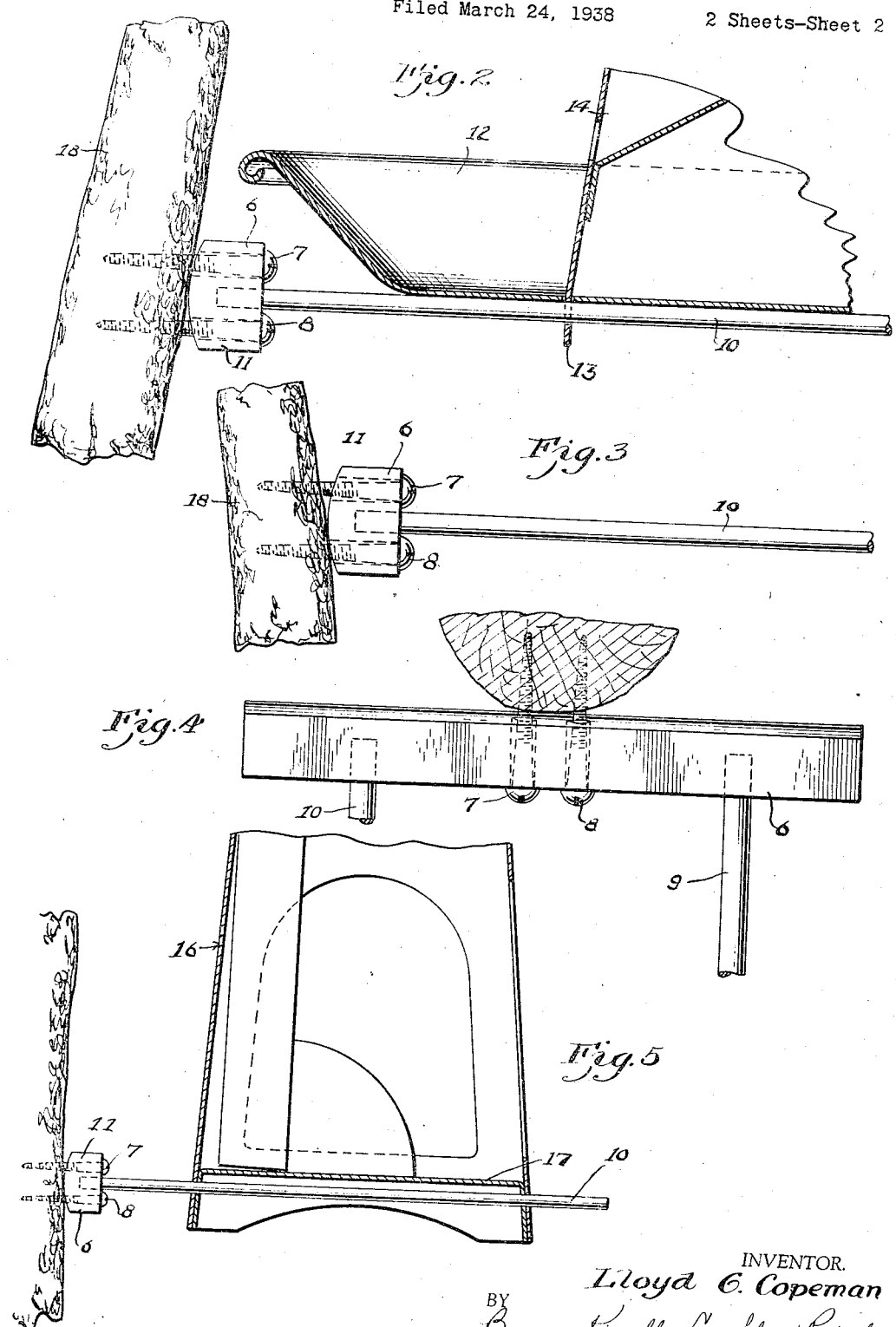
INVENTOR.
Lloyd C. Copeman
BY
Barnes, Kisselle, Laughlin & Raisch
ATTORNEYS Patented Dec. 26, 1939

2,184,633

UNITED STATES PATENT OFFICE 2,184,633

MOUNTING BRACKET

Lloyd G. Copeman, Flint, Mich.

Application March 24, 1938, Serial No. 197,827

7 Claims. (Cl. 119—51)

This invention relates to a mounting and fastening means for bird houses, shelters, feeding stations and other similar structures.

One of the main objections which the general consumers have had in connection with bird houses is the difficulty of mounting the houses to trees, posts and other supports. Up to the present time no satisfactory means has been devised for conveniently mounting a bird house.

An object of the present invention is to provide a supporting means for bird houses, shelters, etc., which may be used by the ordinary unskilled person. A further object of the invention is to provide a fastening which may be used from year to year, the bird houses being fastened thereto so that they may be removed at the end of the season or so that they may be removed at any time to be cleaned. In view of the increasing demand for one-season, waterproof paper houses, the present invention is particularly useful since it is especially adapted for use with collapsible paper bird houses which are replaced each year.

Another object of the invention is to provide a fastening means for a bird house which is so arranged that it may be adjusted to a level position regardless of the slant of the limb or post to which it is attached. This is especially important in the mounting of bird feeding stations since, in order to prevent the spilling of grain, it is essential that the floor of the station be substantially level.

A further feature of the invention rests in the fact that it may be combined with the collapsible bird house in such a manner that it will serve to hold the bird house in assembled relation.

Other objects and features of the invention have to do with the particular design of the fastening means and other details of construction, as will be brought out in the following specification and claims.

In the drawings:

Figs. 2 and 3 are detail views showing the manner in which the bracket may be adjusted to various inclinations on the supporting limbs.

Fig. 4 is a plan view of the device as fastened to a tree.

Fig. 5 illustrates the manner in which the supporting means may be combined with the collapsible bird house or shelter.

Figure 1:
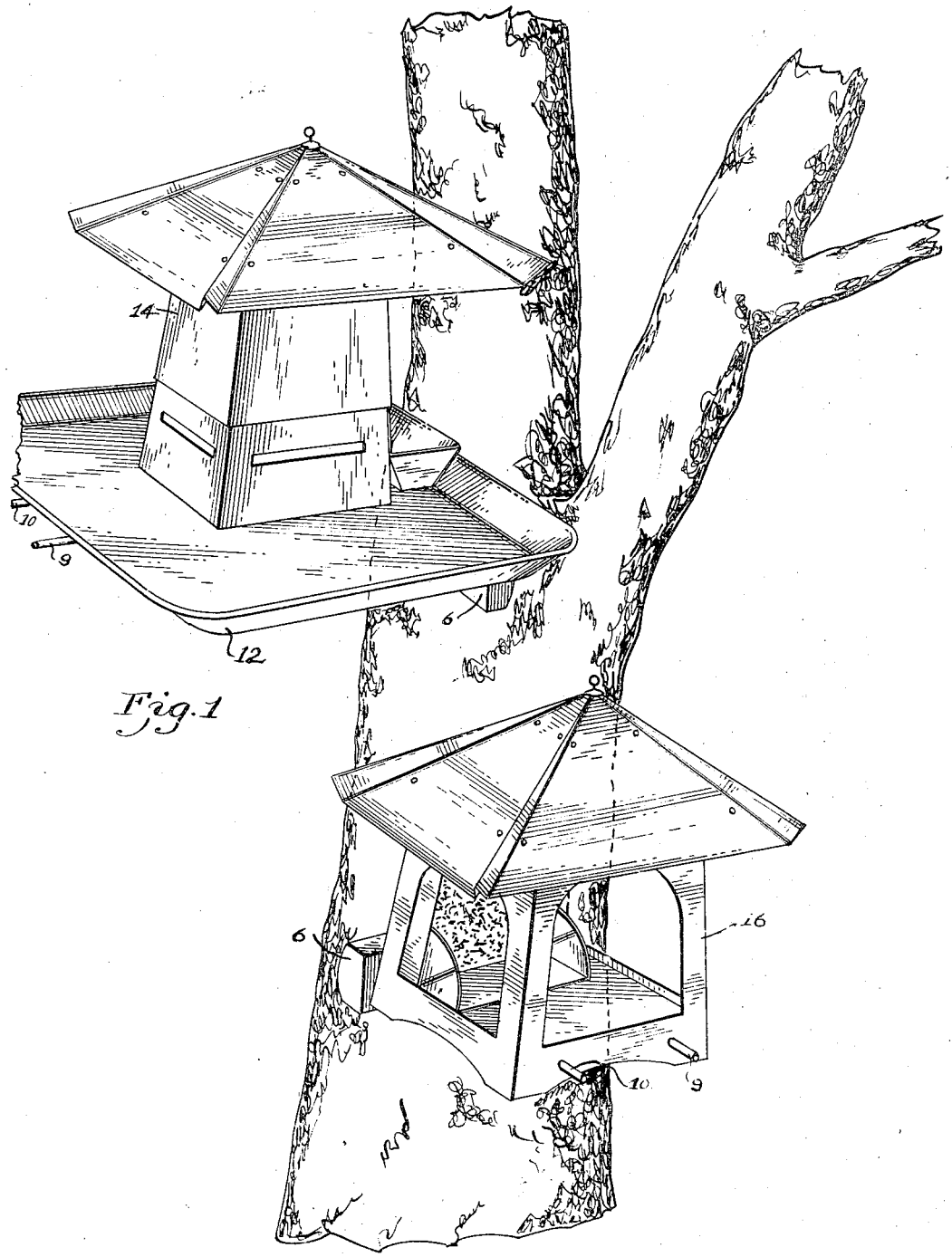
Fig. 1 is a general pictorial view showing the use of the bracket with bird feeding stations.

The form of the invention which has been illustrated for purposes of exemplification, consists of a rectangular block-like member 6 which is fastened to the limb or trunk of a tree by screws 7 and 8. Extending from the member 6, preferably at each end thereof, are rods 9 and 10 which are mounted perpendicular to the member 6.

Referring to Figs. 2, 3 and 5, it will be seen that the back surface 11 of the block 6 is substantially convex or curved outwardly. Holes for the screws 7 and 8 are preferably spaced horizontally as shown in Fig. 4 and should be spaced vertically as shown in Fig. 2, one hole being near the top of the member 6 and the other near the bottom. The block member 6 may be made of wood, metal or other material which is preferably weather resisting.

The parallel rods 9 and 10 may consist of wood dowel rods, each of which has one end embedded in the block 6. The bird house or other structure to be supported on the bracket is provided with aligned holes in its opposite sides through which the rods 9 and 10 may pass (Fig. 5).

If collapsible bird structures are to be used such as shown in Figs. 1, 2, and 5, the rods 9 and 10 may be used to hold the parts in assembled relation. For example, referring to Fig. 2, a portion of a bird feeding station is shown in which a metal base pan 12 is provided with slots through which extend tabs 13, which are formed on the housing structure 14. This structure 14 is fully described in my copending application, Serial No. 202,160. These tabs are provided with holes through which the rods 9 and 10 extend. The main structure portion 14 will thereby be locked with the base pan 12. In Fig. 5 the bird shelter or feed station 16 has a removable bottom 17. The main structure 16 is supported by the dowels 9 and 10 which also hold the bottom 17 in its proper position. The structure 16 is an open sided shelter which houses a suet cake container as fully described in my copending application Serial No. 202,159.

In the use of the supporting bracket it will be seen that the bracket may be mounted on the tree before the housing or shelter is fastened thereto. If the tree 18 is slanting as shown in Fig. 2, the top screw 7 will be driven into the tree farther than the bottom screw 8. In this way the supporting rods 9 and 10 will be raised to a horizontal position regardless of the fact that the portion of the tree at which the bracket is fastened is not vertical. Similarly in Fig. 3, if the tree portion is slanting in the other direction, the bottom screw 8 will be turned in farther than is the top screw and the rods 9 and 10 will again be in horizontal position. When the bracket is mounted as shown, the house may then be fastened thereon by fastening the rods 9 and 10 in the holes provided therefor. The house will be maintained on the rods by friction and may be removed at any time by simply slipping it off the rods. If, for example, the bird house is of the type that should be stored in the wintertime, it may be thus easily removed and the bracket left on the tree ready for use in the following spring. On the other hand, it is also possible to utilize the bracket for a bird house in the spring and summer and for a bird feeding station in the fall and winter.

Another advantage of the fastening bracket is that the rods 9 and 10 may be made long enough so that they extend to the front of the bird house to form perches.

The expression "bird housing structure", as used in the description and claims, is intended to include bird houses or bird feeding stations and other similar structures to be used for bird convenience.

It will be seen that a single screw near the top of the bracket 6 would support the bracket and permit the leveling adjustment. However, it has been found that the use of another screw near the lower edge of the bracket and spaced horizontally from the upper screw will give the bracket more solidity on the tree or post especially if the latter is round in cross-section.

What I claim is:

1. A means for fastening bird houses and the like in level position comprising a bar having a convex curved portion for contacting a support, fastening means in said bar extending through said curved portion to fasten said bar horizontally, and means on said bar for supporting a bird structure.

2. A means for fastening bird houses and the like in level position on a support comprising a rectangular block-like member having a convex side for contacting a support, means for fastening said member horizontally comprising screws spaced vertically and extending through said convex side, and means extending from the other side of said member for supporting a bird house.

3. In combination with a bird housing structure, a means for fastening said structure comprising a bar-like member having a convex side for contacting a support, means for fastening said member to a support comprising frictional means to pass through said member and to be adjustably positioned in said support, and spaced rods fastened at one end to said member and adapted to extend horizontally through portions of said housing structure to support the same.

4. In combination, a means for fastening structures for bird use to slanting trees, limbs and the like comprising a substantially rectangular block-like member having a convex side, means for fastening said member horizontally to a tree or the like comprising screws extending transversely through said member and spaced vertically, spaced parallel rods extending perpendicularly from said member, and a structure for bird use having holes adapted to receive said rods whereby said structure is supported.

5. In combination, a means for fastening structures for bird use to slanting trees, limbs and the like comprising a substantially rectangular block-like member having a convex side, means for fastening said member horizontally to a tree or the like comprising screws extending transversely through said member and spaced vertically, spaced parallel rods extending from said member, and a structure for bird use having parts provided with holes adapted to receive said rods whereby said parts are held in assembled relation and said structure is supported.

6. A bird housing structure comprising a housing unit formed of paper, one or more supporting rods, apertures formed in said paper for receiving and frictionally holding one or more of said supporting rods, a bracket having an outwardly curved surface adapted to contact and be attached to a suitable support, and one or more apertures formed in said bracket for receiving and supporting said supporting rods.

7. A bird housing structure comprising a body member and base member formed of a sheet material, apertures formed in one of said members, and one or more rods fitting in said apertures for assembling one of said members with respect to the other, said one or more rods being socketed in a support arranged and shaped to permit adjustable positioning of said structure whereby it may be supported in an upright position on a member without regard to the angular position of the member.

LLOYD G. COPEMAN.